(12) United States Patent
Lee (10) Patent No.: US 12,083,836 B2
(45) Date of Patent: Sep. 10, 2024

(54) VALVE PULLER

(71) Applicant: TIEN-I INDUSTRIAL CO., LTD., Taichung (TW)

(72) Inventor: Larry Lee, Taichung (TW)

(73) Assignee: TIEN-I INDUSTRIAL CO., LTD., Taichung (TW)

( * ) Notice: Subject to any disclaimer, the term of this patent is extended or adjusted under 35 U.S.C. 154(b) by 395 days.

(21) Appl. No.: 17/517,380

(22) Filed: Nov. 2, 2021

(65) Prior Publication Data

US 2023/0139548 A1 May 4, 2023

(51) Int. Cl.
*B60C 25/18* (2006.01)
*B25B 27/24* (2006.01)

(52) U.S. Cl.
CPC ............. *B60C 25/18* (2013.01); *B25B 27/24* (2013.01); *Y10T 29/53591* (2015.01); *Y10T 29/53596* (2015.01); *Y10T 29/53896* (2015.01)

(58) Field of Classification Search
CPC ............. B60C 25/18; Y10T 29/53591; Y10T 29/53883; Y10T 29/53896; B25B 27/24; B25B 27/0057
See application file for complete search history.

(56) References Cited

U.S. PATENT DOCUMENTS

| | | | | |
|---|---|---|---|---|
| 2,256,061 A | * | 9/1941 | Tapken | B25B 27/24 29/214 |
| 2,480,366 A | * | 8/1949 | Hewitt | B25B 27/24 157/1.1 |
| 3,255,520 A | * | 6/1966 | Jerdon | B60C 25/18 29/221.5 |
| 3,852,839 A | * | 12/1974 | Blessing | B25G 1/085 73/146.8 |
| 4,528,735 A | * | 7/1985 | Eastridge | B60C 25/18 29/221.5 |
| 5,102,100 A | * | 4/1992 | Troncoso, Jr. | B25B 27/02 254/129 |
| 5,205,541 A | * | 4/1993 | Roberts | B25B 27/02 254/131 |
| 5,301,924 A | * | 4/1994 | Kammerer | B25B 27/02 254/131 |
| 6,543,112 B1 | * | 4/2003 | Knaebel | B60C 25/18 29/221.5 |
| 6,574,843 B1 | * | 6/2003 | Meadows | B25B 27/28 29/267 |
| 6,944,924 B2 | * | 9/2005 | Hayes | B25B 27/24 29/221.5 |
| 9,278,439 B1 | * | 3/2016 | Krause | B25B 27/24 |
| 9,616,719 B1 | * | 4/2017 | Jensen | B60C 29/002 |
| 2005/0060860 A1 | * | 3/2005 | Kang | B60C 25/18 29/267 |

(Continued)

*Primary Examiner* — Makena S Markman
(74) *Attorney, Agent, or Firm* — MUNCY, GEISSLER, OLDS & LOWE, PC (57) ABSTRACT

A valve puller is provided, including: a main body; at least one valve assembly, connected to the main body, configured to be connected with at least one valve head; and a support mechanism, including a connection portion and at least one support body, the connection portion being connected to the main body, the at least one support body being changeably connected with the connection portion, the at least one support body being configured to be abutted against a rim to serve as a fulcrum such that the main body is swingable relative to the rim.

9 Claims, 7 Drawing Sheets

(56) References Cited

U.S. PATENT DOCUMENTS

2008/0127472 A1\* 6/2008 Whitehead .............. B25B 27/24
　　　　　　　　　　　　　　　　　　　　　　29/221.5
2010/0018022 A1\* 1/2010 Kicksee ................ B60C 29/007
　　　　　　　　　　　　　　　　　　　　　　29/221.5

\* cited by examiner

VALVE PULLER

BACKGROUND OF THE INVENTION

Field of the Invention

The present invention relates to a valve puller.

Description of the Prior Art

A tire is equipped with an air valve to allow inflation or deflation of the tire. Normally, the air valve is protrusive out of the rim around which the tire is mounted, for connection with an air pump. However, before the tire is sufficiently inflated, the air valve is not forced to be upright enough such that it needs a pulling tool to pull the air valve outward to make the air valve in a suitable position for inflation during the mounting process. In replacement of the tire, the air valve has to be pulled out of the rim by the pulling tool. As a result, the pulling tool is very important for installation and removal of the air valve.

However, most replacement is carried out by using a pliers or the like to pull the air valve during installation and removal of the air valve, which can cause damage to the air valve or to the rim easily.

The present invention is, therefore, arisen to obviate or at least mitigate the above-mentioned disadvantages.

SUMMARY OF THE INVENTION

The main object of the present invention is to provide a valve puller with which it is efficient to pull a valve head and avoids damage to the valve head.

To achieve the above and other objects, a valve puller is provided, including: a main body; at least one valve assembly, connected to the main body, configured to be connected with at least one valve head; and a support mechanism, including a connection portion and at least one support body, the connection portion being connected to the main body, the at least one support body being changeably connected with the connection portion, the at least one support body being configured to be abutted against a rim to serve as a fulcrum such that the main body is swingable relative to the rim.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIGS. 1 to 7 for a preferable embodiment of the present invention. A valve puller 1 of the present invention includes a main body 1, at least one valve assembly and a support mechanism 4.

The at least one valve assembly is connected to the main body 1 and configured to be connected with at least one valve head. The support mechanism 4 includes a connection portion 41 and at least one support body 42, the connection portion 41 is connected to the main body 1, and the at least one support body 42 is changeably connected with the connection portion 41 so that it is easy to change according to various requirements. The at least one support body 42 is configured to be abutted against a rim 6 to serve as a fulcrum such that the main body 1 is swingable relative to the rim 6.

Figure 5:
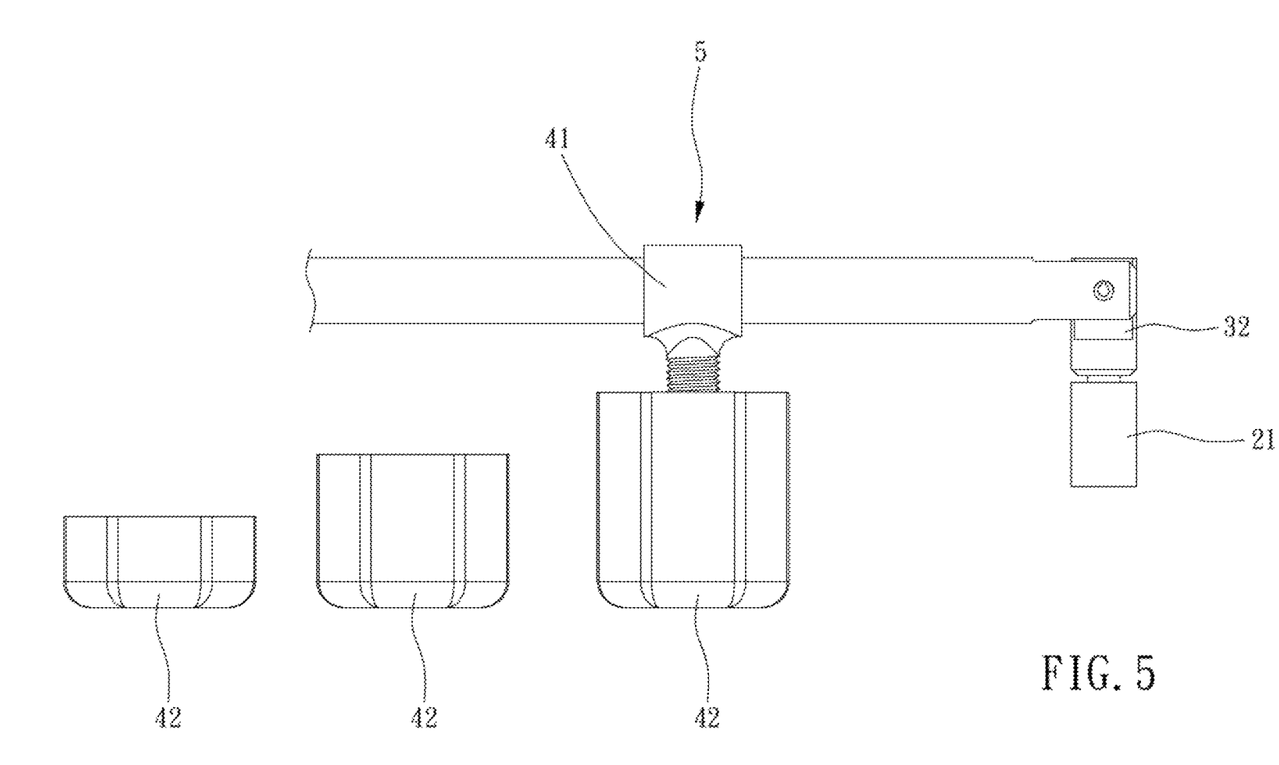
FIG. 5 is a drawing showing a valve puller provided with various support bodies according to a preferable embodiment of the present invention.

In this embodiment, the at least one support body includes a plurality of support bodies 42 having different lengths respectively. The support body 42 is movably screwed to the connection portion 41 so that an entire length of the support body 42 and the connection portion 41 can be finely adjusted by rotating the support body 42. As a result, the support mechanism 4 can be adjusted in two different ways of rough adjustment and fine adjustment. In the rough adjustment, it is to replace the support body 42 with another one having different length. In the fine adjustment, it is to rotate the support body 42 to adjust relative spatial relationship of the support body 42 and the connection portion 41.

Specifically, the support body 42 includes a metal body 421 and a rubber sleeve 422, the metal body 421 is connected with the connection portion 41, and the rubber sleeve 422 is disposed around the metal body 421. The metal body 421 has good stiffness to good resistance to external force or impact, and the rubber sleeve 422 provides good buffering. A side of the rubber sleeve 422 opposite to the main body 1 includes a recessed portion 423, and the recessed portion 423 is configured for engagement of a part of the rim 6 therewithin, for improving stable support.

Specifically, the connection portion 41 is slidably disposed on the main body 1, thus being easy and convenient adjustment. The valve puller further includes at least one positioning member 31, the at least one positioning member 31 is disposed on the main body 1, and the connection portion 41 is blocked by the at least one positioning member 31 in a direction in which the connection portion 41 slides so that the connection portion 41 is prevented from detaching from the main body 1.

Figure 1:
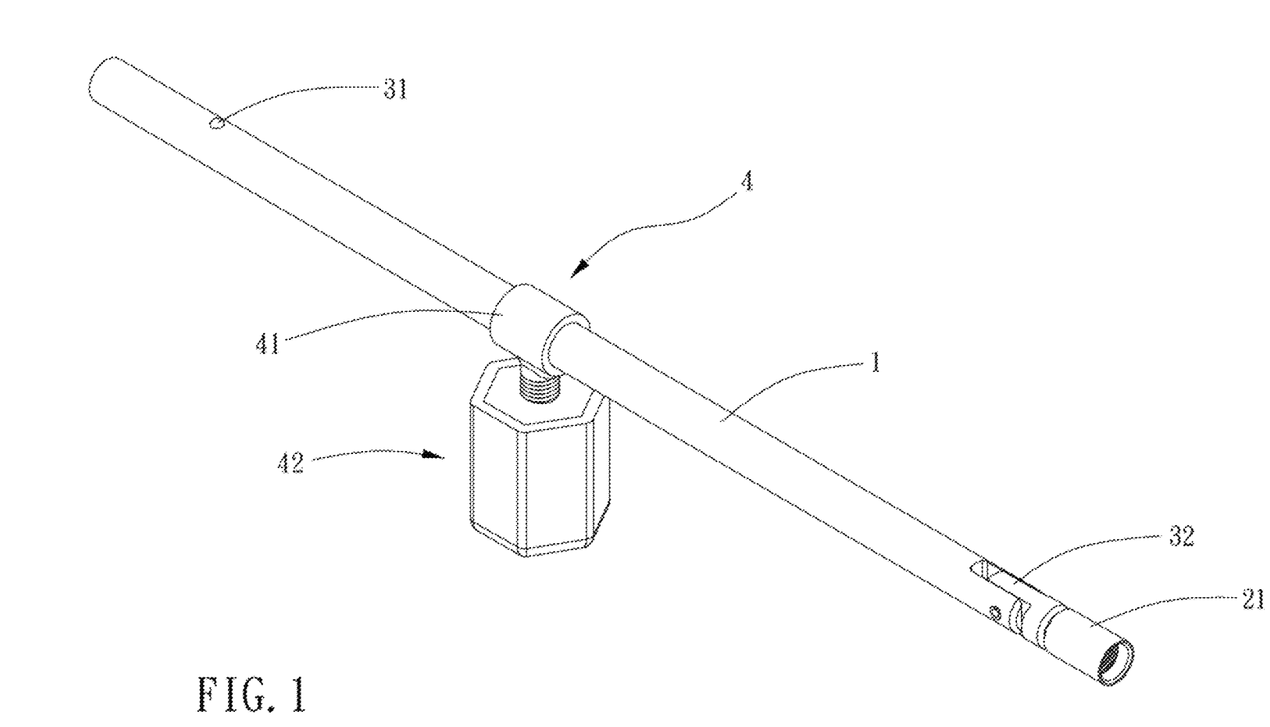
FIG. 1 is a stereogram of a preferable embodiment of the present invention.
Figure 2:
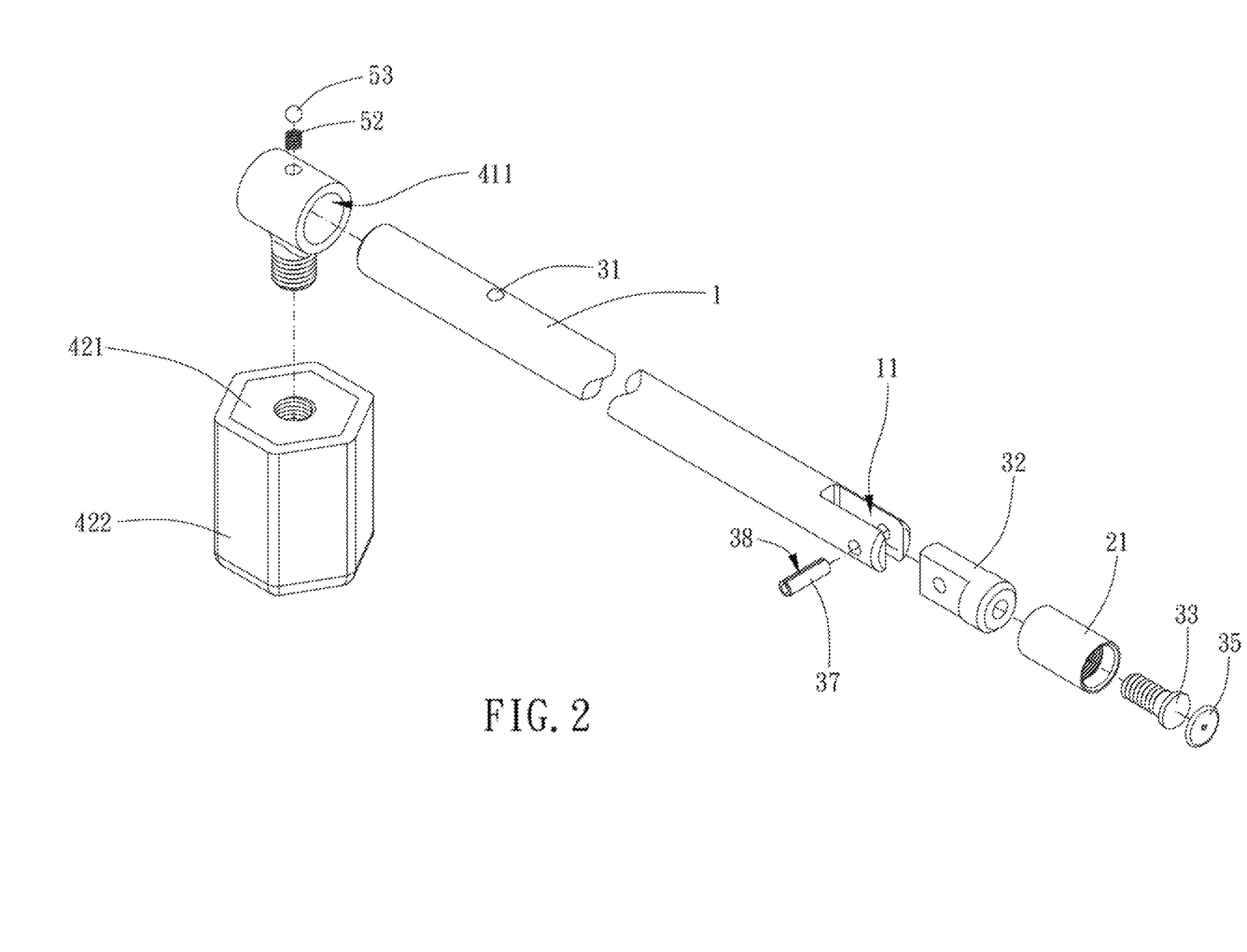
FIG. 2 is a breakdown drawing of a preferable embodiment of the present invention.
Figure 3:
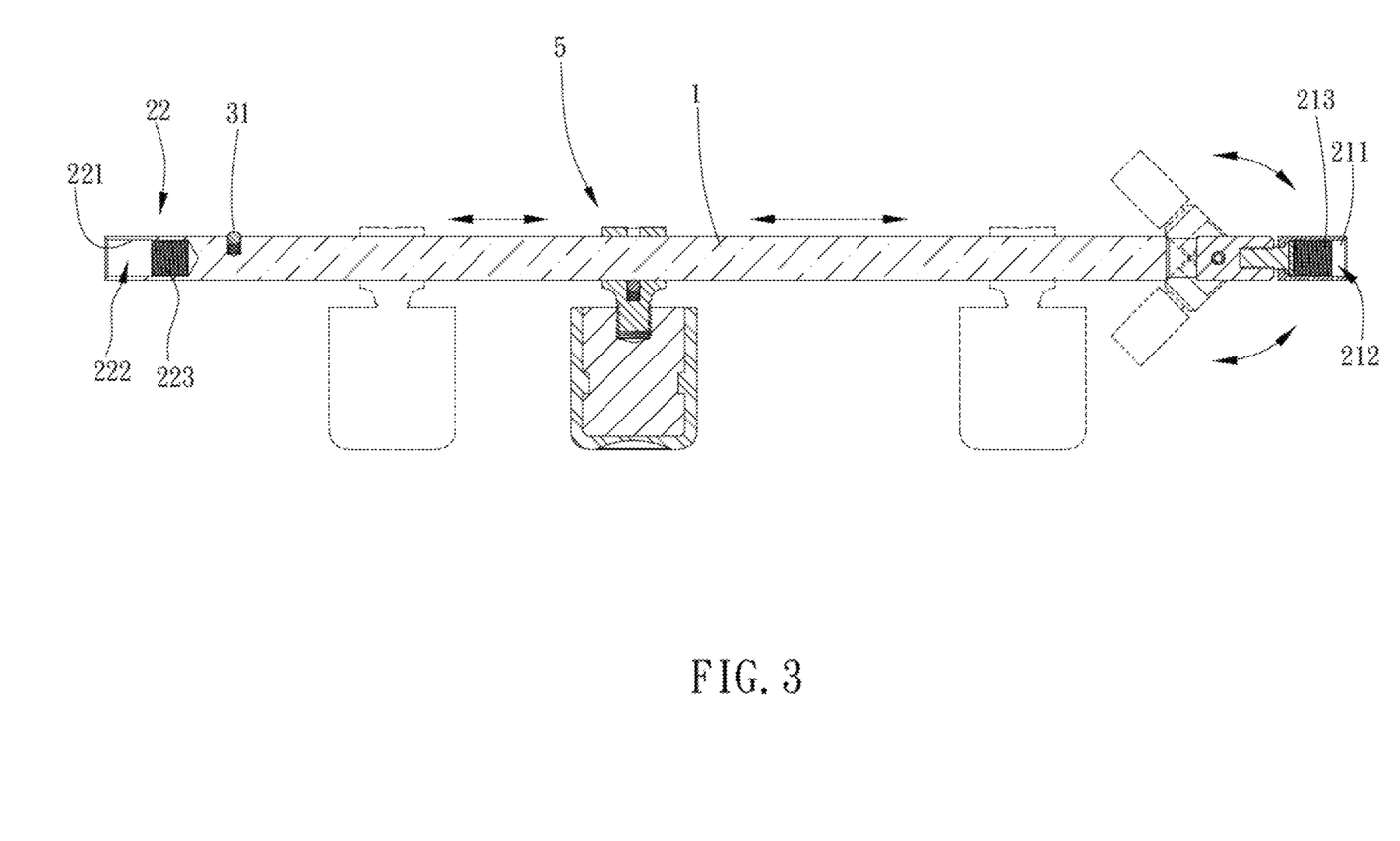
FIG. 3 is a cross-sectional view of a preferable embodiment of the present invention.
Figure 4:
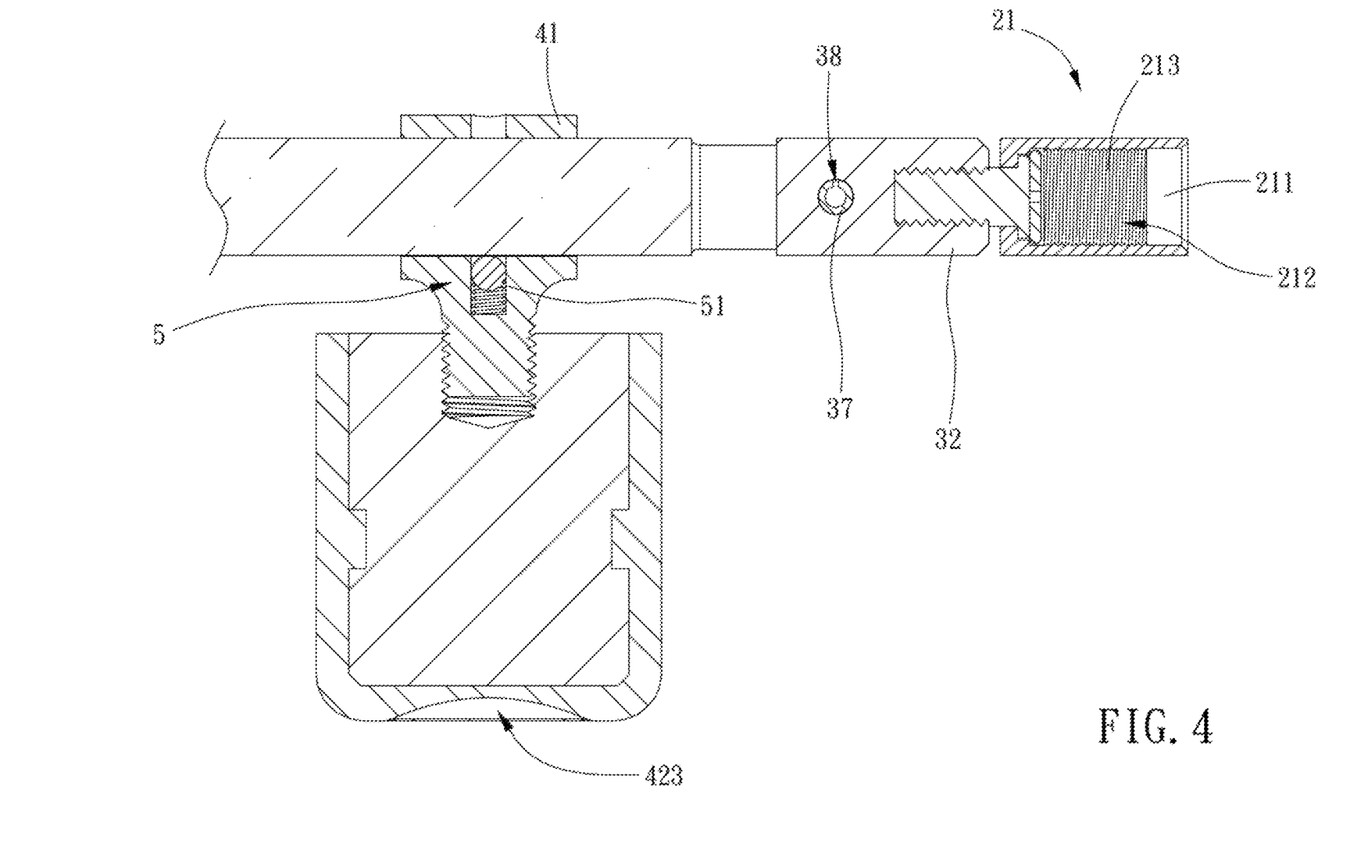
FIG. 4 is a partial enlarged cross-sectional view of a preferable embodiment of the present invention.

Preferably, the support mechanism 4 further includes a resistance mechanism 5, the connection portion 41 includes a through hole 411, the main body 1 is movably disposed through the through hole 411, and the resistance mechanism 5 includes a receiving hole 51, an elastic member 52 and an abutting member 53. The receiving hole 51 is disposed on the connection portion 41 and in communication with the through hole 411, and the elastic member 52 is abutted against and between a hole wall of the receiving hole 51 and the abutting member 53. The elastic member 52 biases the abutting member 53 to abut the main body 1 so that there provides sufficient resistance between the main body 1 and the connection portion 41 to effectively position the connection portion 41.

The valve puller further includes a swingable member 32, the at least one valve assembly includes a plurality of valve assemblies, the plurality of valve assembly includes a first valve assembly 21 and a second valve assembly 22, and the first valve assembly 21 and the second valve assembly 22 are cylindrical. The swingable member 32 is swingably pivoted to the main body 1, the first valve assembly 21 is positioned to the swingable member 32 and movable relative to the main body 1, and the second valve assembly 22 is disposed on the main body 1. In this embodiment, the second valve assembly 22 is integrally formed as a part of the main body 1; the first valve assembly 21 is configured to be connected with a first valve head 71, and the second valve assembly 22 is configured to be connected with a second valve head 72.

Figure 6:
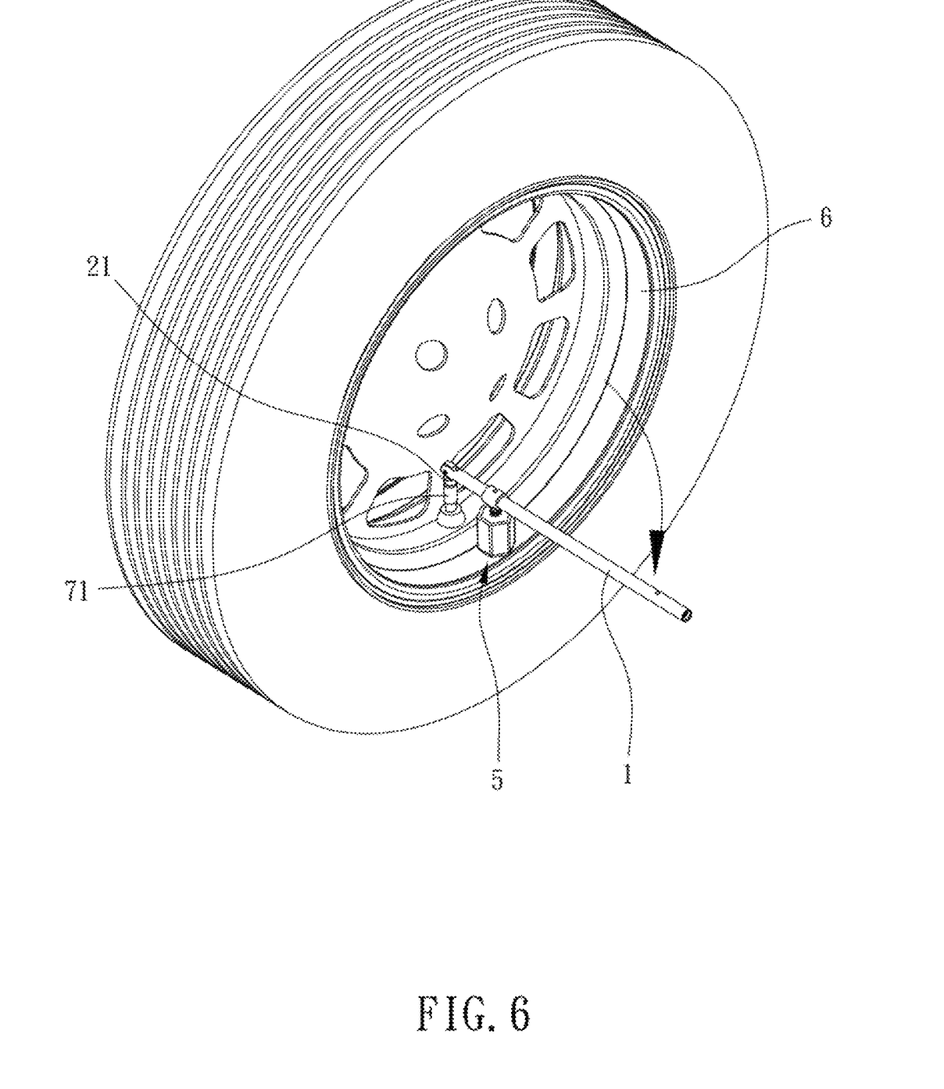
FIG. 6 is a drawing showing the valve puller in use with a first valve assembly according to a preferable embodiment of the present invention.
Figure 7:
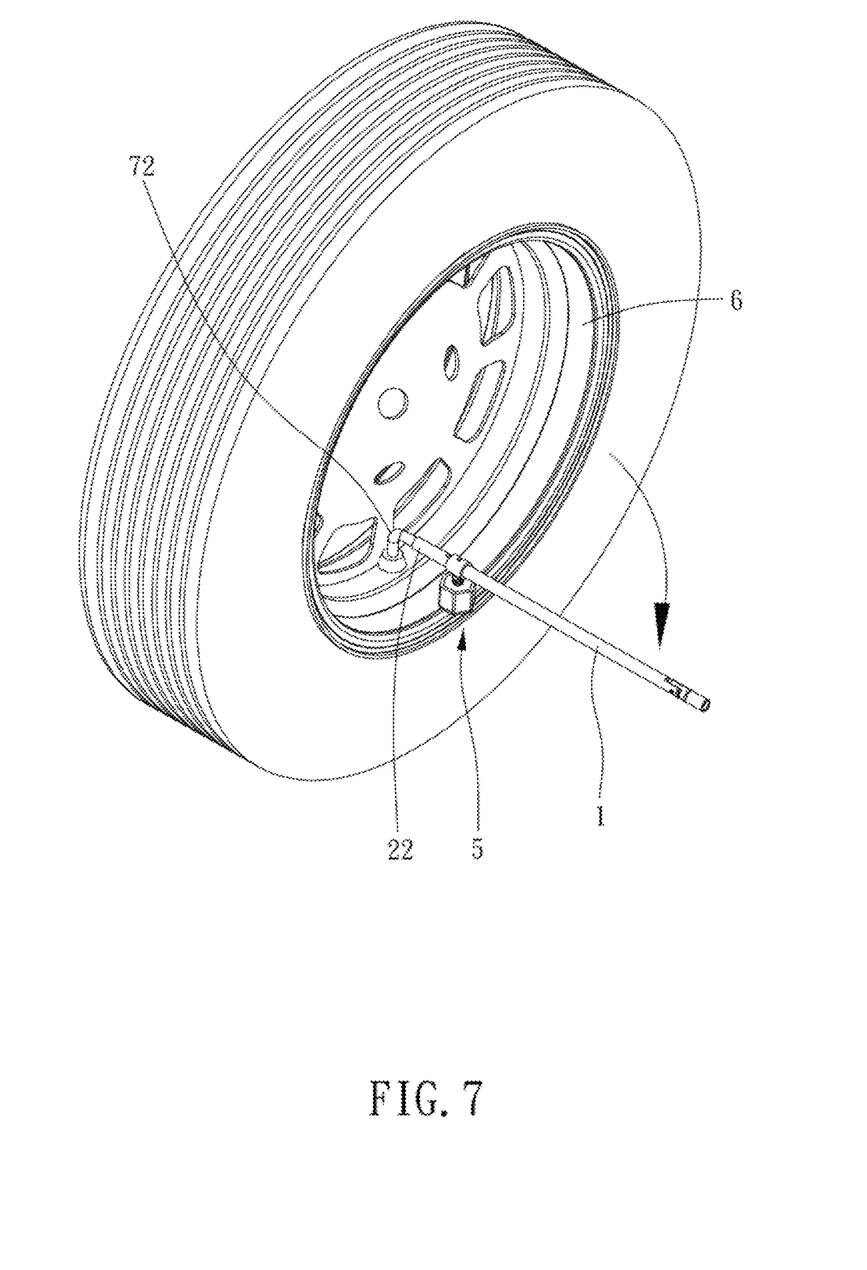
FIG. 7 is a drawing showing the valve puller in use with a second valve assembly according to a preferable embodiment of the present invention.

In use, it is optional to choose the first valve assembly 21 or the second valve assembly 22 for working operation. For example, the first valve assembly 21 is relatively suitable for applying to the first valve head 71 which extends straightly; while the second valve assembly 22 is relatively suitable for applying to the second valve head 72 which extends to be L-shaped. However, the second valve assembly 22 may be used to apply to the first valve head which extends straightly. When the first valve assembly 21 is used, the first valve assembly 21 can be driven to at a suitable angle and position by swinging the swingable member 32, which facilitates respective valve heads in various positions relative to different rims.

Specifically, the first valve assembly 21 includes a first inner wall 211, a first receiving room 212 defined by the first inner wall 211 and a first threaded portion 213, the first receiving room 212 is configured to receive the first valve head 71, and the first threaded portion 213 is disposed on the first inner wall 211 and configured to be screwed with the first valve head 71. Similarly, the second valve assembly 22 includes a second inner wall 221, a second receiving room 222 defined by the second inner wall 221 and a second threaded portion 223, the second receiving room 222 is configured to receive the second valve head 72, and the second threaded portion 223 is disposed on the second inner wall 221 and configured to be screwed with the second valve head 72.

Specifically, an end of the main body 1 includes a slot 11, a part of the swingable member 32 extends within the slot 11, a pin 37 is disposed through the slot 11 and connected to the main body 1 and the swingable member 32, and the pin 37 includes a groove 38 extending axially, wherein with the groove 38 the pin 37 can be deformable during assembling. It is easier to dispose the pin 37 through the main body 1 and the swingable member 32 as the pin 37 is radially contracted by an external force; and the pin 37 can be firmly engaged with and positioned to the main body 1 as the external force is removed from the pin 37.

Preferably, the first valve assembly 21 is rotatably connected to the swingable member 32 so that it is easy to assemble or detach the first valve assembly 21 by rotating the first valve head 71.

In this embodiment, the valve puller further includes a first shaft 33, the first shaft 33 is disposed through the first valve assembly 21 and is connected with the main body 1, and the first valve assembly 21 is freely rotatable about the first shaft 33. Preferably, the first shaft 33 is detachably screwed to the main body 1, which is easy to replace parts.

Preferably, a first pad 35 is received within and positioned to the first receiving room 212 and covers a head portion of the first shaft 33, wherein the first pad 35 is applied to be located between the first valve head 71 and the head portion of the first shaft 33, thus preventing the first valve head 71 and the first shaft 33 from being damaged.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A valve puller, including:
   a main body;
   at least one valve assembly, connected to the main body, configured to be connected with at least one valve head; and
   a support mechanism, including a connection portion and a plurality of support bodies, the connection portion being connected to the main body, each of the plurality of support bodies being configured for replacement by being removably connected with the connection portion, each of the plurality of support bodies being configured to be abutted against a rim to serve as a fulcrum such that the main body is swingable relative to the rim;
   wherein each of the plurality of support bodies is configured to be movably screwed to the connection portion to adjust a distance between the connection portion and each of the plurality of support bodies respectively;
   wherein each of the plurality of support bodies has a different length respectively,
   the valve puller further includes a first shaft, the first shaft is disposed through the at least one valve assembly and is connected with the main body, and the at least one valve assembly is freely rotatable about the first shaft.

2. The valve puller of claim 1, further including a swingable member, wherein the at least one valve assembly includes a plurality of valve assemblies, the plurality of valve assemblies include a first valve assembly and a second valve assembly, the swingable member is swingably pivoted to the main body, the first valve assembly is connected to the swingable member and movable relative to the main body, the second valve assembly disposed on the main body; the first valve assembly is configured to be connected with a first valve head, and the second valve assembly is configured to be connected with a second valve head.

3. The valve puller of claim 2, wherein the first valve assembly is rotatably connected to the swingable member.

4. The valve puller of claim 2, wherein the second valve assembly is integrally formed as a part of the main body.

5. The valve puller of claim 1, wherein the connection portion is slidably disposed on the main body.

6. The valve puller of claim 5, further including at least one positioning member, wherein the at least one positioning member is disposed on the main body, and the connection portion is blocked by the at least one positioning member in a direction in which the connection portion slides.

7. The valve puller of claim 5, wherein the support mechanism further includes a resistance mechanism, the connection portion includes a through hole, the main body is movably disposed through the through hole, the resistance mechanism includes a receiving hole, an elastic member and an abutting member, the receiving hole is disposed on the connection portion and in communication with the through hole, the elastic member is abutted against and between a hole wall of the receiving hole and the abutting member, and the elastic member biases the abutting member to abut the main body.

8. The valve puller of claim 7, wherein
the valve puller further includes a swingable member and at least one positioning member,
the at least one valve assembly includes a plurality of valve assemblies, the plurality of valve assemblies include a first valve assembly and a second valve assembly, the swingable member is swingably connected to the main body, the first valve assembly is connected to the swingable member and movable relative to the main body, and the second valve assembly is disposed on the main body;
the first valve assembly is configured to be connected with a first valve head, and the second valve assembly is configured to be connected with a second valve head;
the at least one positioning member is disposed on the main body, and the connection portion is blocked by the at least one positioning member in a direction in which the connection portion slides;
the first valve assembly is rotatably connected to the swingable member;
the second valve assembly is integrally formed as a part of the main body;
each of the plurality of support bodies includes a metal body and a rubber sleeve, the metal body is connected with the connection portion, and the rubber sleeve is disposed around the metal body;
a side of the rubber sleeve opposite to the main body includes a recessed portion;
the first shaft is detachably screwed to the main body;
the first valve assembly and the second valve assembly are cylindrical;
an end of the main body includes a slot, a part of the swingable member extends within the slot, a pin is disposed through the slot and connected to the main body and the swingable member, and the pin includes a groove extending axially;
a first pad is received within and positioned to the first receiving room and covers a head portion of the first shaft, the first valve assembly includes a first inner wall, a first receiving room defined by the first inner wall and a first threaded portion, the first receiving room is configured to receive the first valve head, and the first threaded portion is disposed on the first inner wall and configured to be screwed with the first valve head;
the second valve assembly includes a second inner wall, a second receiving room defined by the second inner wall and a second threaded portion, the second receiving room is configured to receive the second valve head, and the second threaded portion is disposed on the second inner wall and configured to be screwed with the second valve head;
the first valve head extends straightly, and the second valve head extends to be L-shaped.

9. The valve puller of claim 1, wherein each of the plurality of support bodies includes a metal body and a rubber sleeve, the metal body is connected with the connection portion, and the rubber sleeve is disposed around the metal body.

* * * * *